United States Patent
Raether et al.

[11] 3,922,344
[45] Nov. 25, 1975

[54] DISINFECTANT COMPOSITIONS USEFUL AGAINST PROTOZOAN OOCYSTS

[75] Inventors: Wolfgang Raether, Dreieichenhain; Helmut Diery, Kelkheim, Taunus; Ulrich Cuntze, Hofheim, Taunus, all of Germany

[73] Assignee: Hoechst Aktiengesellschaft, Frankfurt am Main, Germany

[22] Filed: Apr. 11, 1974

[21] Appl. No.: 460,132

[30] Foreign Application Priority Data
Apr. 14, 1973 Germany............................ 2319045

[52] U.S. Cl. .................. 424/211; 260/944; 260/945; 424/350; 424/351; 424/353
[51] Int. Cl.² ............................................ A01N 9/36
[58] Field of Search .......... 424/211, 350, 351, 353; 260/944, 945, 924

[56] References Cited
UNITED STATES PATENTS
3,480,698  11/1969  Cyba................................... 260/945
3,591,682  7/1971  Thiolliere et al. .................. 424/211

*Primary Examiner*—Leonard Schenkman
*Attorney, Agent, or Firm*—Curtis, Morris & Safford

[57] ABSTRACT

Compounds of the formula I

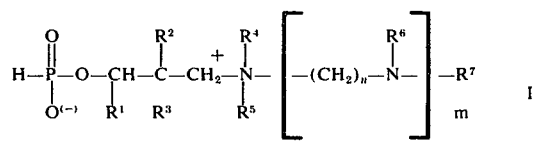

in which $R^1$ stands for hydrogen or methyl, $R^2$, $R^3$, $R^4$, $R^5$ and $R^6$ which may be identical or different, each stands for hydrogen or alkyl radicals of 1 to 4 carbon atoms, $R^7$ stands for an alkyl or alkenyl radical of 8 to 18 carbon atoms, $n$ is an integer of 2 or 3 and $m$ is zero or an integer from 1 to 4, having an excellent action against pathogenic bacteria and protozoans especially against oocyst of coccidia when they are used in mixture with one or several chlorinated hydrocarbons.

9 Claims, No Drawings

DISINFECTANT COMPOSITIONS USEFUL AGAINST PROTOZOAN OOCYSTS

This invention relates to a disinfectant.

It especially relates to a disinfectant effective against pathogenic bacteria and protozoans, especially against the infective stages, i.e., the oocysts of different species of coccidia which is especially used for the disinfection of stables and outruns.

Coccidia, the microorganism causing coccidiosis, are protozoans which are to be found in all species of fowls, in birds and in a great number of domestic and commercially reared animals, especially rabbits, sheep, cattle, dogs and cats.

Oocysts and spores of bacteria having solid protective walls generally are hard to kill by disinfective substances because the usual disinfectants cannot penetrate into the interior of these permanent forms. This is especially true in the case of oocysts of coccidia which are especially well protected against all the usual disinfective substances by their lipoid-containing keratin walls.

A great number of substances killing oocysts are known, for example carbon disulfide, cresol, lysol, chloroform, methylene chloride, but practically all these substances need too long periods of time and too high concentrations until the effective destruction of the oocysts is reached.

A certain exception as to the period of action is carbon disulfide, however, the required concentration to be applied raises considerable drawbacks, for example, the toxicity for mammals, the combustibility of the disinfectants which involves the danger of inflammation and of the formation of explosive mixtures as well as a difficult processing in industry.

Therefore, it is the object of the invention to develop disinfective substances having a rapid and optimal disinfective action while being non toxic and not dangerous in its application.

Now it was found that compounds of the formula I

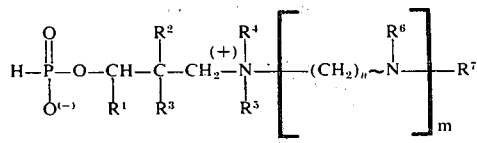

in which $R^1$ stands for hydrogen or methyl, $R^2$, $R^3$, $R^4$, $R^5$ and $R^6$ which may be identical or different, each stands for hydrogen or alkyl radicals of 1 to 4 carbon atoms, $R^7$ stands for an alkyl or alkenyl radical of 8 to 18 carbon atoms, $n$ is an integer of 2 or 3 and $m$ is zero or an integer from 1 to 4, have an excellent action against the pathogenic bacteria and protozoans mentioned above when they are used in mixture with one or several chlorinated hydrocarbons.

The compounds of the formula I are used in mixture with chlorinated organic solvents, for example, methylene chloride, chloroform, carbon tetrachloride, chlorobenzene, dichlorobenzene, trichlorobenzene, tetrachlorobenzene, ethylene chloride, trichloroethane, tetrachloroethane or tetrachloroethylene. An emulsifier may, optionally, be added, for example, a fat acid polyglycol ester, an alkylbenzene sulfonate, a chlorinated paraffin sulfonate, a sulfosuccinic acid ester, an oxethylated alkyl phenol or a mixture of these compounds.

The compounds show a high killing effect against oocysts after a short time of action.

The compounds are prepared by reacting the cyclic phosphates of the formula II

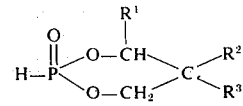

with amines of the formula III

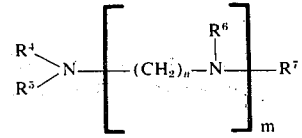

in which $R^1$, $R^2$, $R^3$, $R^4$, $R^5$, $R^6$ and $R^7$ as well as $n$ and $m$ each is defined as in formula I. The reactive components are advantageously reacted in the ratio of about 1 mol of amine to 1 mol of phosphite. In some cases it may be suitable to use one component, preferably the amine, in a slight excess. The reaction is advantageously effected at a temperature ranging from 60°–150°C. Depending on the boiling and melting temperature of the amine used the reaction can be effected in the melt or using a suitable polar solvent, for example, water or an alcohol. The reaction products directly precipitate in pure state so that in general a special purification can be dispensed with.

When the reaction has been effected in the presence of solvents, it is only necessary to distill them off.

EXAMPLE OF PREPARATION 1. 3-(3-coconutalkylaminopropyl-ammonium)-2.2-dimethyl-propyl-phosphorous acid ester 15.0 g (= 0.1 mol) of 2-oxo-(2H)-5,5-dimethyl-1,3-dioxa-2-phosphorinan and 27.4 g (= 0.1 mol) of coconut alkylpropylene diamine were boiled under reflux in 100 c.c. water for 2 hours, while stirring. The solution was evaporated to dryness.

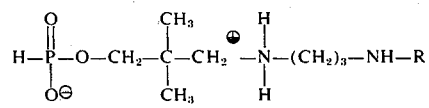

were obtained.

R = the alkyl radical having a chain distribution analogous to that of the coconut acid.

| Molecular weight: | calculated: 424 |
|---|---|
|  | found: 436 |
| Nitrogen: | calculated: 6.6 % |
|  | found: 6.4 % |

The following compounds were prepared in an analogous manner:

2. 3-coconutalkyl ammonium-2.2-dimethyl-propyl-phosphorous acid ester

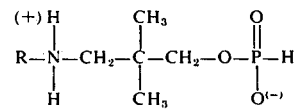

R = the alkyl radical having a chain distribution analogous to that of the coconut acid.

| Molecular weight: | calculated: 365 |
| --- | --- |
| | found: 380 |
| Nitrogen: | calculated: 3.8 % |
| | found: 3.8 % |

3.
3-[2-(2-dodecylaminoethyl)-aminoethyl-ammonium]-2.2.dimethyl-propyl-phosphorous acid ester $$C_{12}H_{25}-NH-(CH_2)_2-NH-(CH_2)_2-\overset{H}{\underset{H}{\overset{(+)}{N}}}-CH_2-\overset{CH_3}{\underset{CH_3}{C}}-CH_2-O-\overset{O}{\underset{O^{(-)}}{P}}-H$$

| Molecular weight: | Calculated: 421 |
| --- | --- |
| | found: 440 |
| Nitrogen: | Calculated: 10.0 % |
| | found: 9.7 % |

4.
3-(coconutalkylaminopropylammonium)-propyl-phosphorous acid ester $$R-NH-(CH_2)_3-\overset{H}{\underset{H}{\overset{(+)}{N}}}-CH_2-CH_2-CH_2-O-\overset{O}{\underset{H^{(-)}}{P}}-H$$

R stands for an alkyl radical having a chain distribution analogous to that of the coconut acid.

| Molecular weight: | calculated: 396 |
| --- | --- |
| | found: 400 |
| Nitrogen: | Calculated: 7.1 % |
| | found: 6.9 % |

5.
3-octadecenylammonium-2.2-dimethyl-propyl-phosphorous acid ester

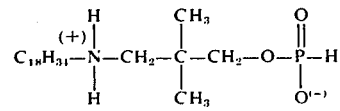

| Molecular weight: | Calculated: 410 |
| --- | --- |
| | found: 451 |
| Nitrogen: | Calculated: 3.4 % |
| | found: 3.2 % |

As further examples of compounds of the formula I to be used in accordance with the invention, there may be mentioned:

6.
3-isononylammonium-2.2-dimethyl-propyl-phosphorous acid ester

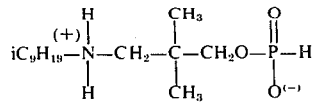

7.
3-(dodecyl-dimethyl-ammonium)-2.2-dimethyl-propyl-phosphorous acid ester

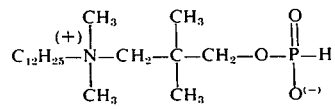

8.
3-(dodecyl-diethyl-ammonium)-1-methyl-propyl-phosphorous acid ester

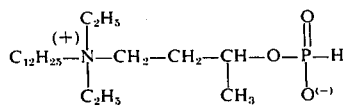

9.
3-(decyl-butyl-ammonium)-2.2-diethyl-propyl-phosphorous acid ester

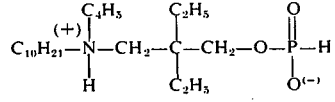

10.
3-decylammonium-2-methyl-2-propyl-propylphosphorous acid ester

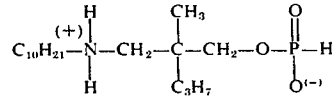

11.
3-[2-(2-dodecylaminoethyl)-aminoethylammonium]-2-n-butyl-2-ethyl-propylphosphorous acid ester

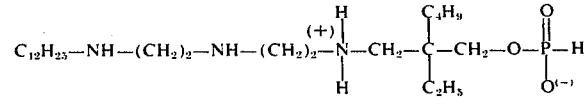

12.
3-(3-coconutalkyl-N-methyl-amino-propyl-ammonium)-propyl-phosphorous acid ester

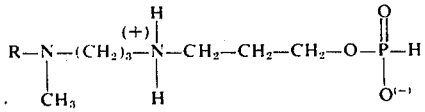

R stands for the alkyl radical having a chain distribution analogous to that of the coconut fat acid.

13.
3-[3-(3-coconutalkylaminopropyl)-aminopropyl-ammonium]-phosphorous acid ester

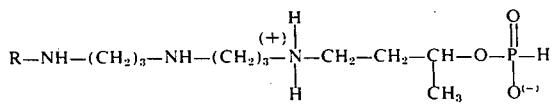

R stands for the alkyl radical having a chain distribution analogous to that of the coconut acid.

The compounds of the formula I are used together with one or several chlorinated hydrocarbons, preferably in aqueous solution, for the disinfection of rooms and objects, especially of stables and their outruns. Such a disinfectant contains a mixture of 10 to 90 percent by weight, preferably 20 to 70 percent by weight, of a compound of the formula I and 90 to 10 percent by weight, preferably 80 to 30 percent by weight, of a chlorinated hydrocarbon or a mixture of several hydrocarbons dissolved in water. Optionally, 0.1 to 10 percent by weight of an emulsifier, calculated on the compound of formula I, may be added.

The disinfectant to be used is suitably diluted with water to a content of active substance of 0.25 to 10 percent by weight.

EXAMPLES (Tests for activity)

The oocyst-destroying effect was determined according to the following method:

Oocysts of the species of *Eimeria tenella* were collected from the excrement of hens previously infested and subjected to the test substances for the periods of time and at the concentrations as indicated in the following Table. The preparations were then washed once with dimethyl formamide and five times with water with centrifugation and the oocyst-containing sediment was used for the oral infection of chickens 4 days old. Each of 4 to 8 animals per concentration applied were administered about $2 - 3 \cdot 10^5$ treated oocysts.

After termination of the test, the average body weight per test group (absolute average weight increase, respectively weight decrease) was ascertained. The excrement findings were adspected every day during the whole test period and judged according to the following scheme:

| Excrement findings | Judgement |
|---|---|
| Normally formed, solid, sporadically pultaceous (brown) | = 1 |

-continued

| Excrement findings | Judgement |
|---|---|
| mainly normally formed, partly liquid, mucous (green-white) | = 2 |
| mainly liquid, watery, minimal blood admixture, mucous | = 3 |
| liquid, mucous, distinct blood admixtures | = 4 |

At the end of the test, the animals were killed with chloroform and the appendices were subjected to macroscopic and microscopic examination for pathological and anatomical changes.

The judgements of the pathological changes of the intestinal mucosa were determined as follows:

| Intestinal mucosa | Judgement |
|---|---|
| no special findings | 1 |
| swollen, gelatinous, glassy, catarrhal fibrinous inflammations | 2 |
| sporadically petechiae, local haemorrhagic inflammations | 3 |
| diffuse pink - turning into diffuse haemorrhagic inflammation, partly sangineous intestinal contents | 4 |

The excretion of oocysts reveals the number of the non sporulated oocysts excreted in the excrement.

| Number of oocysts per visual field | Judgement |
|---|---|
| 1 | 1 |
| 2 - 10 | 2 |
| 11 - 50 | 3 |
| 51 - 200 | 4 |
| 201 - 400 | 5 |
| over 400 | 6 |

The following Tables 1 and 2 show the synergistic disinfection effect of the mixtures of the invention of the compounds indicated in the examples with chlorinated organic solvents compared to the effect of aqueous solutions of these compounds on the one hand and that of chlorinated organic solvents on the other hand.

Moreover, the Tables show the superior effect of the mixtures of the invention as compared to the commercial preparation Dekaseptol (registered trade mark) reportedly a mixture of chlorinated hydrocarbons, carbon disulfide and a soap.

In these tests, the emulsifier used was castor oil with ethylene oxide in the molar ratio of 1:36.

The concentrations indicated are calculated on the content of a compound of formula I.

In the columns headed excrement findings, appendix findings and oocysts/unit field each time the above-mentioned judgements are indicated.

The test results of Tables 1 and 2 have been obtained under conditions which were not homogeneous in the different cases and thus cannot be compared easily.

TABLE 1

| Test A Preparation | | Period of action (min) | concentration | Excrement findings +d:4,5,6,7 (+d=day after infection | total number of surviving animals | Appendix findings (chicken 1 - 4) | weight increase in g | oocysts/ unit field (chicken 1 - 4) |
|---|---|---|---|---|---|---|---|---|
| 24.7 % | compound 1 | | | | | | | |
| 49.5 % | o-dichloro-benzene | 5 | 3 | 1111 | 4/4 | 1111 | 18.5 | 2102 |

TABLE 1-continued

| Test A Preparation | | Period of action (min) | con- cen- tra- tion | Excrement findings +d:4,5,6,7 (+d=day after infection | total number of surviving animals | Appendix findings (chicken 1 – 4) | weight increase in g | oocysts/ unit field (chicken 1 – 4) |
|---|---|---|---|---|---|---|---|---|
| 24,7% | water | 10 | 3 | 1111 | 4/4 | 1111 | 19.7 | 0021 |
| 1,2 % | emulsifier | 20 | 3 | 1111 | 4/4 | 1111 | 22.8 | 0001 |
| 16,4 % | compound 1 | | | | | | | |
| 16,4 % | water | 5 | 3 | 1111 | 4/4 | 1111 | 20.5 | 0010 |
| 32,8 % | trichloro- benzene | 10 | 3 | 1111 | 4/4 | 1111 | 22.5 | 0000 |
| 32,8 % | o-dichloro- benzene | 20 | 3 | 1111 | 4/4 | 1111 | 25.6 | 0000 |
| 1,6 % | emulsifier | | | | | | | |
| 24,7 % | compound 2 | 5 | 3 | 1111 | 4/4 | 1111 | 19.5 | 0022 |
| 49,5 % | o-dichloro- benzene | 10 | 3 | 1111 | 4/4 | 1111 | 20.5 | 0001 |
| 24,7 % | water | | | | | | | |
| 1,2 % | emulsifier | 20 | 3 | 1111 | 4/4 | 1111 | 23.5 | 0000 |
| Dekaseptol(R) | | 5 | 6 | 1211 | 4/4 | 2212 | 13.8 | 2434 |
| | | 10 | 6 | 1111 | 4/4 | 1212 | 16.5 | 2302 |
| | | 20 | 6 | 1111 | 4/4 | 1111 | 18.5 | 2312 |
| o-dichlorobenzene | | 20 | 12 | 2442 | 2/4 | 2323 | 8.5 | 4354 |
| trichlorobenzene | | 20 | 12 | 2342 | 3/4 | 2232 | 9.5 | 2345 |
| 50 % o-dichlorobenzene 50 % trichlorobenzene | | 20 | 24 | 2322 | 4/4 | 1222 | 12.5 | 2125 |
| Infection control | | 20 | — | 2434 | 2/4 | 4523 | 7.5 | 3456 |
| O-control | | 20 | — | 1111 | 4/4 | 1111 | 23.2 | 0000 |

TABLE 2

| Test B Preparation | Period of action (min) | con- cen- tra- tion | Excrement findings +d:4,5,6,7 (+d=day after infection) | total number of surviving animals | Appendix findings (chicken 1 – 4) | weight increase in g | oocysts/ unit field (chicken 1 – 4) |
|---|---|---|---|---|---|---|---|
| Compound 5 | 20 | 3 | 2432 | 3/4 | 3434 | 8.2 | 2465 |
| 24,7 % compound 5 49,5 % o-dichlorobenzene 24,7 % water 1,2 % emulsifier | 20 | 3 | 1111 | 4/4 | 1111 | 18.7 | 2011 |
| compound 2 | 20 | 3 | 1211 | 4/4 | 2111 | 14.2 | 2132 |
| 24,7 % compound 2 49,5 % o-dichlorobenzene 24,7 % water 1,2 % emulsifier | 20 | 3 | 1111 | 4/4 | 1111 | 20.3 | 0000 |
| compound 3 | 20 | 3 | 1232 | 3/4 | 2332 | 2.6 | 6644 |
| 24,7 % compound 3 49,5 % o-dichlorobenzene 24,7 % water 1,2 % emulsifier | 20 | 3 | 1111 | 4/4 | 1111 | 19.2 | 2010 |
| o-dichlorbenzene | 20 | 12 | 2434 | 3/4 | 2334 | 5.8 | 4543 |
| trichlorbenzene | 20 | 12 | 3243 | 3/4 | 3334 | 7.9 | 4426 |
| 50 % o-dichlorobenzene 50 % trichlorbenzene | 20 | 24 | 2332 | 4/4 | 2222 | 10.6 | 4543 |
| Decaseptol(R) | 20 | 6 | 1111 | 4/4 | 1111 | 17.0 | 2101 |
| Infection control | 20 | — | 2443 | 2/4 | 3454 | 1.8 | 4532 |
| O-control | 20 | — | 1111 | 4/4 | 1111 | 20.9 | 0000 |

What is claimed is:

1. A disinfectant composition useful against protozoan oocysts comprising a mixture of (a) a compound of the formula

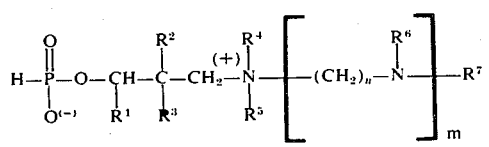

in which $R^1$ is hydrogen or methyl, $R^2$, $R^3$, $R^4$, $R^5$ and $R^6$ may be the same or different and are hydrogen or alkyl of 1 to 4 carbon atoms, $R^7$ is alkyl of 8 to 18 carbon atoms or alkenyl of 8 to 18 carbon atoms, $n$ is 2 or 3 and $m$ is zero or 1 to 4; and (b) a chlorinated organic solvent selected from the group consisting of methylene chloride, chloroform, carbon tetrachloride, chlorobenzene, dichlorobenzene, trichlorobenzene, tetrachlorobenzene, ethylene chloride, trichloroethane, tetrachloroethane, tetrachloroethylene and mixtures thereof; said mixture being in the ratio of 10 to 90 percent by weight of (a) to 90 to 10 percent by weight of (b).

2. The disinfectant composition of claim 1 wherein the ratio is 20 to 70 percent by weight of (a) to 80 to 30 percent by weight of (b).

3. The disinfectant composition of claim 1 dissolved in water in a concentration of 0.25 to 10 percent by weight.

4. The disinfectant composition of claim 1 wherein compound (a) is a 3-(3-coconut alkyl aminopropylammonium)-2,2-dimethylpropyl-phosphorus acid ester.

5. The disinfectant composition of claim 1 wherein compound (a) is a 3-coconut alkyl ammonium-2, 2-dimethylpropyl-phosphorus acid ester.

6. The disinfectant composition of claim 1 wherein compound (a) is 3-[2-(2-dodecylaminoethyl)-aminoethyl-ammonium]-2,2-dimethyl-propyl-phosphorus acid ester.

7. The disinfectant composition of claim 1 wherein compound (a) is a 3-(coconut-alkylaminopropyl-ammonium)-propyl-phosphorus acid ester.

8. The disinfectant composition of claim 1 wherein compound (a) is 3-octadecenylammonuim-2,2-dimethylpropyl-phosphorus acid ester.

9. A method of destroying protozoan oocysts which comprises applying an effective amount of the composition of claim 1 diluted with water to a concentration of 0.25 to 10 percent by weight to the loci of said oocysts.

* * * * *